US006109767A

United States Patent [19]
Rodriguez

[11] Patent Number: 6,109,767
[45] Date of Patent: *Aug. 29, 2000

[54] HONEYCOMB LIGHT AND HEAT TRAP FOR PROJECTOR

[75] Inventor: Ernesto M. Rodriguez, Round Rock, Tex.

[73] Assignee: Minnesota Mining and Manufacturing Company, St. Paul, Minn.

[ * ] Notice: This patent is subject to a terminal disclaimer.

[21] Appl. No.: 08/883,446

[22] Filed: Jun. 26, 1997

[51] Int. Cl.[7] .................................................. F21V 29/00
[52] U.S. Cl. ...................... 362/294; 362/354; 362/373; 353/52
[58] Field of Search ..................... 362/280, 293, 362/294, 373, 268, 354, 290; 353/52, 56, 57

[56] References Cited

U.S. PATENT DOCUMENTS

| | | | |
|---|---|---|---|
| 3,920,323 | 11/1975 | Nishitani | 353/61 |
| 4,763,975 | 8/1988 | Scifres et al. | 360/96.15 |
| 4,974,132 | 11/1990 | Naum | 362/261 |
| 5,015,088 | 5/1991 | Rhomberg et al. | 352/198 |
| 5,187,373 | 2/1993 | Gregori | 250/551 |
| 5,285,363 | 2/1994 | Meuse | 362/293 |
| 5,692,821 | 12/1997 | Rodriguez, Jr. et al. | 353/52 |
| 5,820,242 | 10/1998 | Rodriguez et al. | 353/119 |
| 5,826,962 | 10/1998 | Rodriguez, Jr. | 353/82 |
| 5,828,427 | 10/1998 | Faris | 349/5 |
| 5,876,105 | 3/1999 | Rodriquez, Jr. | 353/119 |

*Primary Examiner*—Sandra O'Shea
*Assistant Examiner*—John Anthony Ward
*Attorney, Agent, or Firm*—Brian W. Peterman; Nester F. Ho

[57] ABSTRACT

A light trap for a projector, such as an integrated LCD projector, is provided for placement in ventilation channels to prevent escape of light through the channels while allowing free flow of cooling fluid through the channels. The light trap is constructed of material having a honeycomb-like structure, with conduits in the light trap being preferably disposed obliquely between the light source and the duct opening. The light trap may be coated or treated to increase absorption of visible and infrared radiation. A light trap according to this invention not only prevents escape of extraneous light from the projector's ventilation openings, but it assists in controlling the heat load generated by the light source, and it provides less resistance to air flow than does a louvered panel that is typically used to cover a ventilation opening in a projector thus reducing the amount of noise associated with the ventilation system.

32 Claims, 5 Drawing Sheets

HONEYCOMB LIGHT AND HEAT TRAP FOR PROJECTOR

FIELD OF THE INVENTION

This invention relates primarily to the field of projectors utilizing high-intensity light sources, including in particular computer display, television and overhead projectors which project enlarged images on a remote screen. In particular, this invention relates to a permeable "light trap" that prevents escape of light through ventilation ducts in a projector.

BACKGROUND OF THE INVENTION

There are many types of machines that employ high-intensity radiation sources, wherein the radiation and the associated heat need to be controlled. For example, many types of projectors, including overhead projectors, slide projectors, television projectors, and movie projectors utilize high intensity light sources in order to provide sufficient light energy to illuminate a remote surface with a magnified and projected image from a small image source. Computer addressable projection systems have become available in recent years, whereby a computer generated image may be projected onto a wall or screen. These originally took the form of a projection TV system or an LCD panel that could be placed on an overhead projector. The overhead projector provided the light source and optics to project the computer-generated image from the LCD panel. So-called "integrated projectors" are now available, which provide a complete projection system for computer-generated images. The video output of a computer can be connected directly to an integrated projector, which is typically a compact unit including a light source, power supply, LCD panel, optical elements, and the required electronics.

Typical light sources used in video projector systems can usefully employ light energy only in visible wavelengths, between about 400 and 700 nanometers, for example, but they also generate large quantities of light energy in the near infrared wavelengths, roughly between about 780 and 2500 nanometers. This infrared radiation heats the objects that are exposed to it, and the heat must be dissipated without allowing the temperature of components in the projector to rise to harmful levels. Most projectors are designed to capture the infrared radiation from the light source, convert it to heat, and exhaust the heat from the projector using a forced air ventilation system.

Integrated projectors have presented a number of new challenges to the engineers who design them. They are expected to be compact and light weight, for they are often transported by their users in conjunction with portable computers. At the same time, they require higher intensity light sources than are typically used with slide projectors and overhead projectors, because of the higher optical density and higher resolution of the LCD panels, the higher level of image magnification that is desired, and because they are often used in relatively high ambient light conditions. A typical overhead projector uses a 150 watt bulb, while it is becoming desirable to use 400 watt (and higher) light sources in some integrated projectors under development. Along with higher intensity light sources comes more light and heat that needs to be controlled. The heat control problem is especially acute with respect to portable integrated projectors, which are often unplugged and packed into carrying bags or cases before they have had time to cool down after use (contrary to the manufacturer's instructions). If the cooling fan is turned off prematurely, enough heat can build up in a projector's lamp compartment (or plenum) to cause extremely hot air to exit the projector, perhaps sufficiently hot to melt or burn plastic and other projector components and to potentially cause injury and damage to nearby objects.

Exemplary integrated projectors are described in two patent applications owned by the assignee of the present invention. The first is U.S. patent application Ser. No. 08/623,729, entitled "COMPACT INTEGRATED LCD PROJECTOR", filed Mar. 29, 1996abandoned. The second is U.S. patent application Ser. No. 08/673,292, entitled "METHOD AND SYSTEM FOR THERMAL MANAGEMENT WITHIN A DISPLAY DEVICE", filed Jun. 28, 1996, issued as U.S. Pat. No. 5,692,821. Both of those applications are hereby incorporated by reference as background references.

In some projectors, the light source is located in a compartment or plenum that is open at both ends to permit air to circulate or to be drawn through the plenum, and a fan may be provided to force air through the plenum when the projector is connected in to a power source. The plenum is typically designed with louvered grills at each end to prevent undesirable amounts of light from escaping through the ends of the plenum, while permitting movement of cooling air through the plenum. Both the fan and the louvers may cause undesirable noises to be emitted by the projector when it is in use. In integrated projectors, the increased heat load generated by a higher-intensity light source requires the use of higher capacity cooling fans, which increase the amount of undesirable noise associated with the projector. Not only is the fan louder, but the noise of air rushing through the louvers may become unacceptably loud.

It is therefore desirable to provide a projector, such as a portable integrated projector, that contains a high-intensity light source that is sufficiently bright to project an image across a room from a small LCD panel under high ambient light conditions. It is further desirable to provide a light source assembly that does not permit objectionable amounts of light to escape through its ventilation channels, and that is not excessively noisy due to the operation of its fan and ventilation system. The desired light source assembly will preferably not release dangerously hot air during use or if it is unplugged immediately after use, and it will be energy efficient. Such a light source assembly is not known to exist in the prior art, and it is required for the development of the next generation of integrated projectors.

SUMMARY OF THE INVENTION

The deficiencies in the prior art are addressed by the present invention, which provides a high intensity light source assembly including "light traps," which may serve the multiple purposes of (a) preventing extraneous light from escaping from the ventilation openings of the assembly, (b) permitting free flow of cooling air through the assembly, (c) reducing the size of the fan required for ventilation, (d) reducing the noise associated with air rushing through louvered structures, and (e) reducing the temperature of air exiting the light source assembly if the fan is turned off while the unit is still hot from use.

In preferred embodiments, the present invention involves placing a light trap made of a material having a honeycomb-like configuration of walls and channels (referred to herein as "honeycomb material") in a cooling air channel in a projector. The honeycomb material is preferably made of a material that is substantially opaque to the radiation of interest (e.g. visible and infrared light) and able to withstand the temperatures that are expected to be encountered in the selected application. When a ventilation fan is used, the cooling air can pass easily and quietly through the honeycomb material. By placing the honeycomb material so that its conduits are oblique to the axis of the cooling air channel, it will effectively prevent much of the light or other radiation from escaping from the radiation source (e.g. light bulb) and into the external environment.

This description of the invention focuses on a presently preferred embodiment that provides an improved integrated LCD (liquid crystal display) projector, using a high-intensity light source that emits substantial amounts of visible and infrared radiation. It will be recognized that this invention may also be useful for applications involving other types of radiation, such as for example, RF, microwave or X-ray radiation. Thus, references to "light" in this disclosure are exemplary, as the invention may be beneficially used to control other types of radiation as well.

In the presently preferred embodiment, the walls of the honeycomb material are constructed of aluminum, which is opaque to light and has a high thermal conductivity. The honeycomb material may have hexagonal conduits or channels having a cross-sectional area of about $\frac{1}{16}"-\frac{1}{4}"$ and being about $\frac{1}{2}"-1"$ long, but other geometries and sizes may be employed within the scope of this invention. The honeycomb material may be cut on a bias to the conduit direction so that light traveling perpendicular to a face of the honeycomb material cannot pass directly through a conduit—the light instead encounters a conduit wall where it is reflected and/or absorbed before it can escape from the conduit. Cooling air can pass easily through the honeycomb material in a relatively laminar flow regime, even when the conduits are oblique to the general direction of air flow.

By using honeycomb material according to this invention to block light in a cooling air channel, instead of conventional louvered panels as is common in the prior art, several significant benefits are obtained. First, the honeycomb material creates substantially less impedance to air flow than does a conventional louvered panel, so a smaller fan, which is typically lighter and quieter, may be used. Also, the required amount of air can pass through the honeycomb material relatively quietly, without causing the turbulent, rushing sound associated with air passing through a louvered panel. Second, the honeycomb material is more effective at preventing light from escaping into the room than is a typical louvered panel.

This invention also provides an important benefit when the projector is unplugged before it is permitted to cool using the forced air system. In that event, the light source and its surroundings may be very hot, and a quantity of very hot air can accumulate in the plenum. As this hot air escapes through the louvers in a prior art system, it is not given an opportunity to cool, and it may burn or melt parts of the projector that it contacts, or it may damage other nearby objects. By using the present invention in the ventilation air path, the honeycomb material acts as a heat exchanger. As the hot air exits the plenum and cool air enters to replace it, both streams pass through the honeycomb material in opposite directions, and the hot air may be cooled substantially (up to 40–50 degrees Celsius measured in experiments with prototypes) before it exits the projector. This acts to protect the projector itself and other nearby objects from heat damage.

This invention also provides a radiation trap that can be used to provide a barrier to other kinds of radiation, and that is permeable to air or other fluids that may be required for cooling or other purposes. A honeycomb material may be selected that has walls made of a substance that is impermeable to the radiation of interest, and that may be selected or treated to absorb the radiation. In some embodiments, several stages of honeycomb material may be used in series to further reduce the amount of light or other radiation that passes through the trap, for example by arranging the stages such that the conduits in each stage are not parallel to the conduits in other stages.

Thus, the present invention provides numerous advantages over the prior art and solves several problems associated with continuing efforts to make projectors smaller, lighter, brighter, quieter, and more energy efficient. A detailed description of a preferred embodiment of the present invention is set forth below. One skilled in the art will appreciate that the present invention may also be used in many other analogous embodiments, within the bounds set forth in the claims appended hereto.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiments of the invention which are illustrated in the appended drawings, which drawings form a part of this specification.

It is noted, however, that the appended drawings illustrate only exemplary embodiments of the invention and are, therefore, not to be considered limiting of its scope, for the invention may admit to other equally effective embodiments.

DETAILED DESCRIPTION OF PREFERRED EMBODIMENTS

Figure 1:
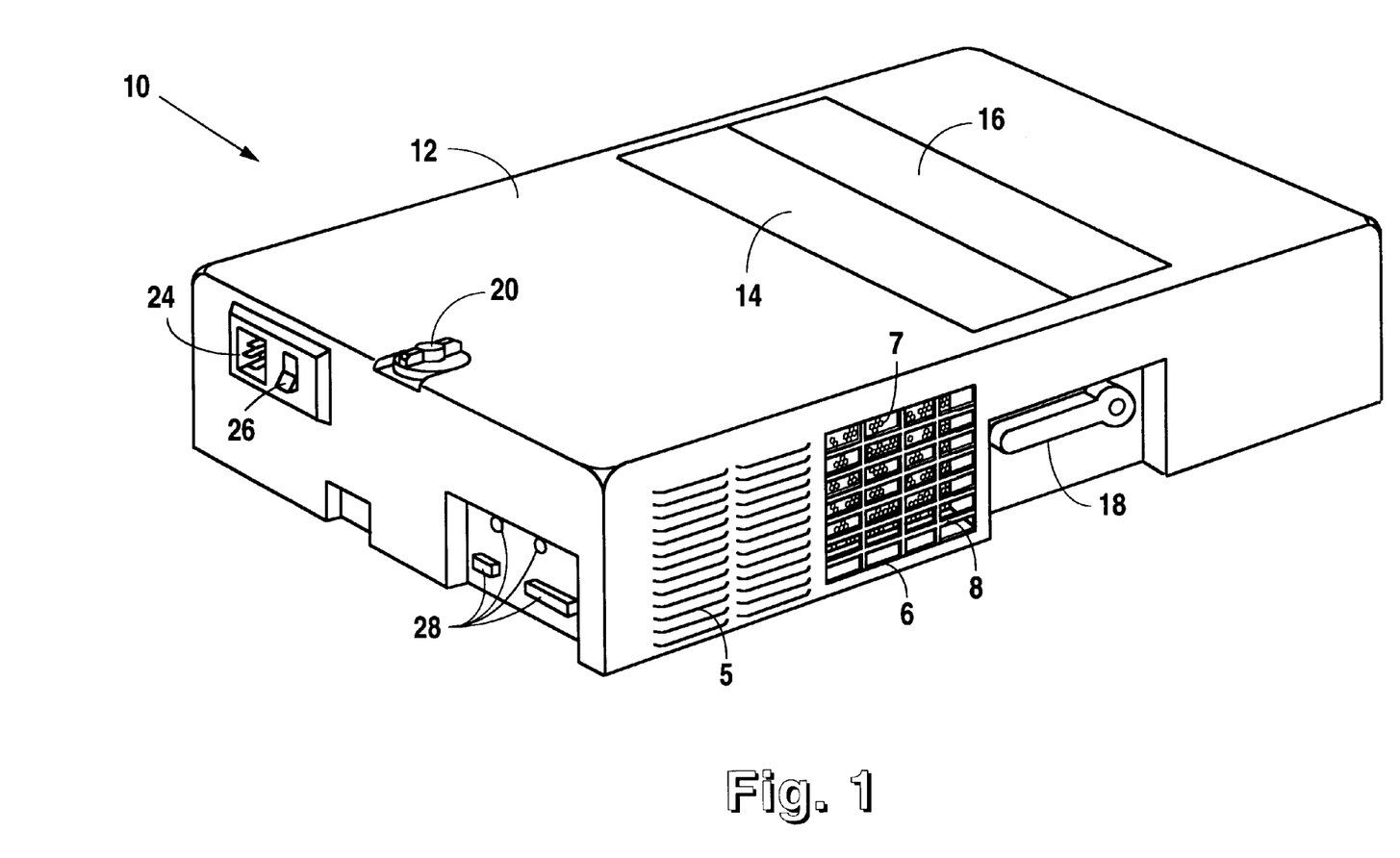
FIG. 1 is a perspective view of an exemplary embodiment of a compact integrated LCD projector, which may advantageously utilize the present invention.

With reference now to the figures, and in particular with reference to FIG. 1, there is depicted one exemplary embodiment of a compact electronic projector 10 suitable for use with the present invention. Exterior features of projector 10 include a case or body 12, two upper retracting doors 14 and 16, an actuation lever 18, a rear foot adjustment knob 20, a receptacle 24 for a power supply cable, a power (on/off) switch 26, and one or more ports providing various types of electrical connectivity (such as video and data drivers), each indicated as 28. In this embodiment, body 12 is box-like, and its upper surface (which includes doors 14 and 16) is planar and generally parallel with its lower, planar surface (in the storage position). This shape provides a particularly low profile, but those skilled in the art will appreciate that other profiles can be provided which are not as rectangular as projector 10. Body 12 may be constructed of any durable material, preferably a lightweight polymer such as acrylonitrile butadiene styrene (ABS) or polycarbonate. FIG. 1 shows a louvered panel 5 that is typically used in projectors for providing ventilation through the projector case. A ventilation opening 6 using the present invention is also shown, with light trap 7 made of a honeycomb-like structure disposed behind protective grille 8.

Figure 2:
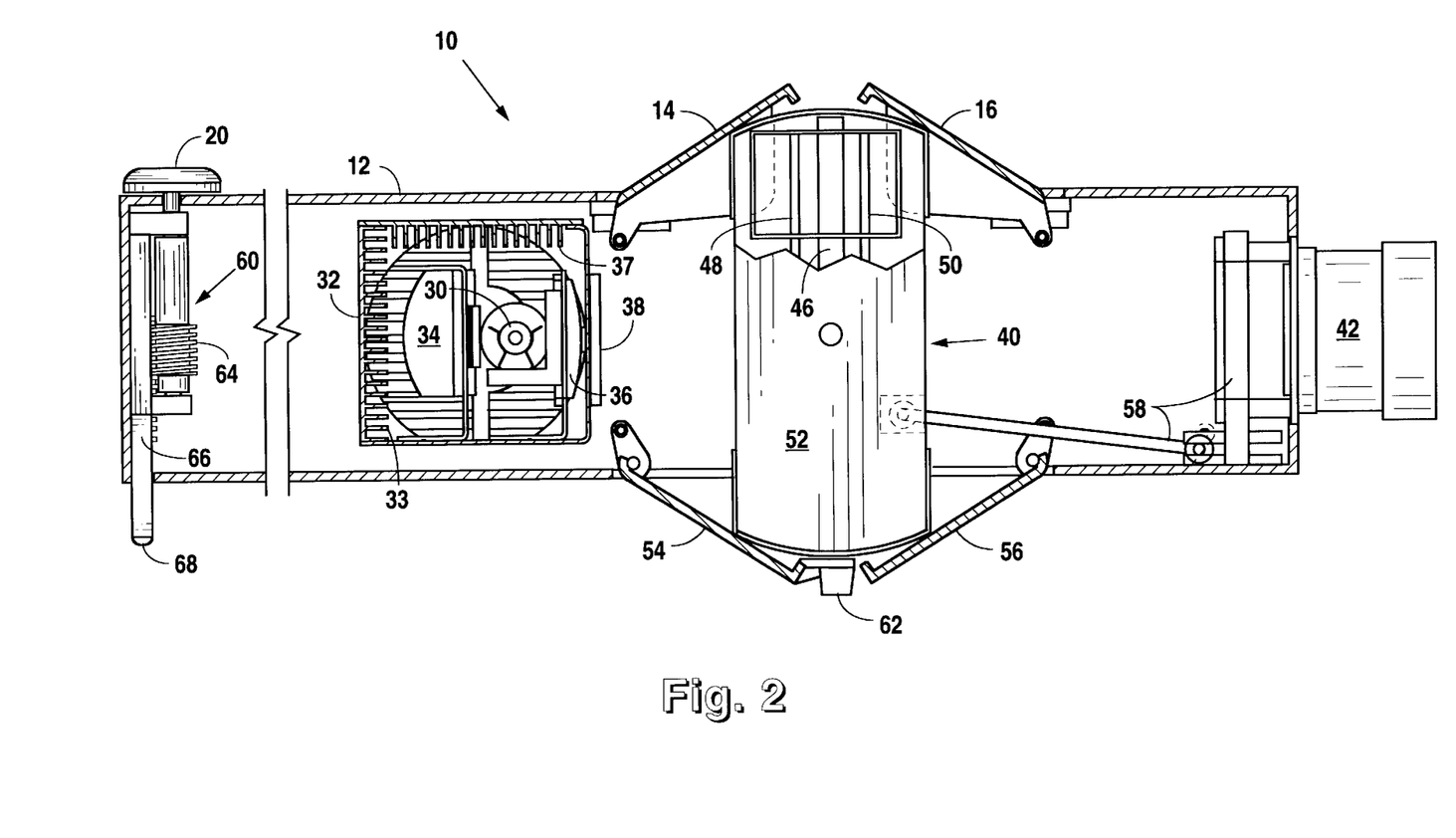
FIG. 2 is a cross sectional elevation view of an exemplary compact integrated LCD projector, showing a cross section of the light source assembly in the plenum.

FIG. 2 is a longitudinal cross-section of projector 10 depicting its deployed state and shows that projector 10 additionally comprises a light source 30 with a nearby heat sink 32, a collimator (parabolic reflector) 34 and condenser lens 36 oppositely disposed about light source 30, an infrared filter (hot mirror) 38 proximate condenser lens 36, a display assembly 40, and a projection lens 42. All of these components are located in body 12 although, as seen in FIG. 2, display assembly 40 and projection lens 42 protrude from body 12 when projector 10 is deployed for operation. Display assembly 40 is pivotally or rotatably attached to the inside of body 12 in such a manner that in the deployed state, display assembly 40 is generally perpendicular to the light path.

Figure 4:
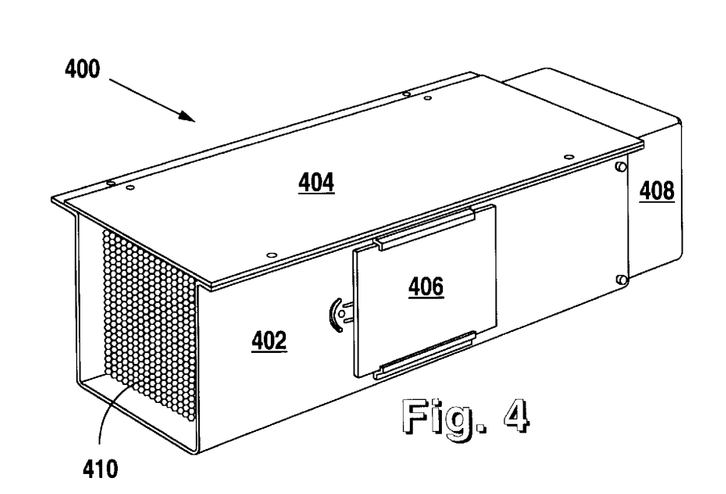
FIG. 4 is a perspective view of a light source assembly incorporating the present invention.
Figure 5:
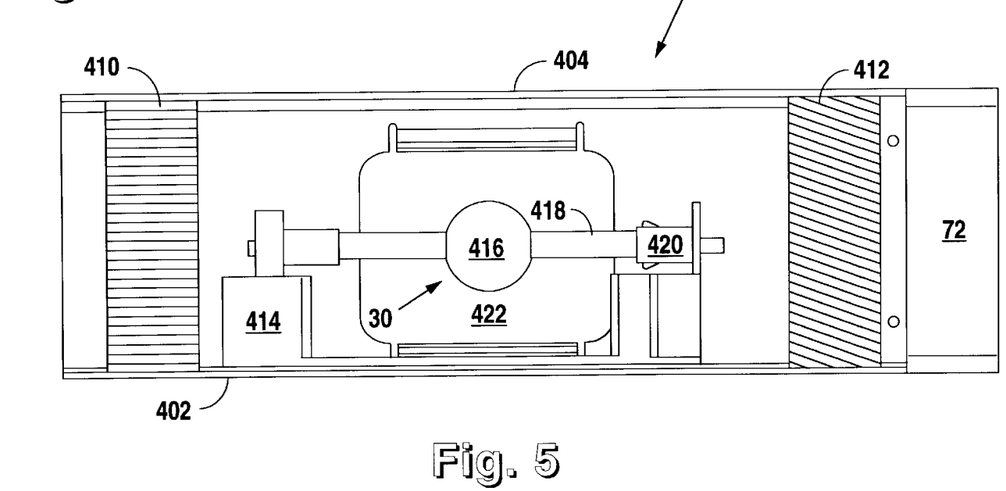
FIG. 5 is a cross sectional elevation view of the light source assembly, including light traps in accordance with the present invention.

Light source 30 is preferably a high-intensity source such as an EVD (halogen) lamp or a high-output metal halide lamp (e.g., 250 watt, 400 watt, or 575 watt) available from, for example, Osram (part of Sylvania Co. of Germany) or Philips Electronics of The Netherlands. The light source may be connected to a 12 volt DC power supply 44 located in body 12 (see FIG. 3). In the depicted exemplary embodiment, heat sink 32 consists of two ribbed strips about 10" (25.4 cm) long, constructed of 5052 aluminum extrusion. In another exemplary embodiment of the light source assembly, as shown in FIGS. 4 and 5, plenum lid 404 may be a ribbed aluminum extrusion while plenum body 402 is made from aluminum sheet. Condenser lens 36 is preferably piano-convex and constructed of a borosilicate glass such as Pyrex (a trademark of Corning, Inc.). IR filter 38 is a conventional hot mirror such as those available from Bausch & Lomb.

Figure 3:
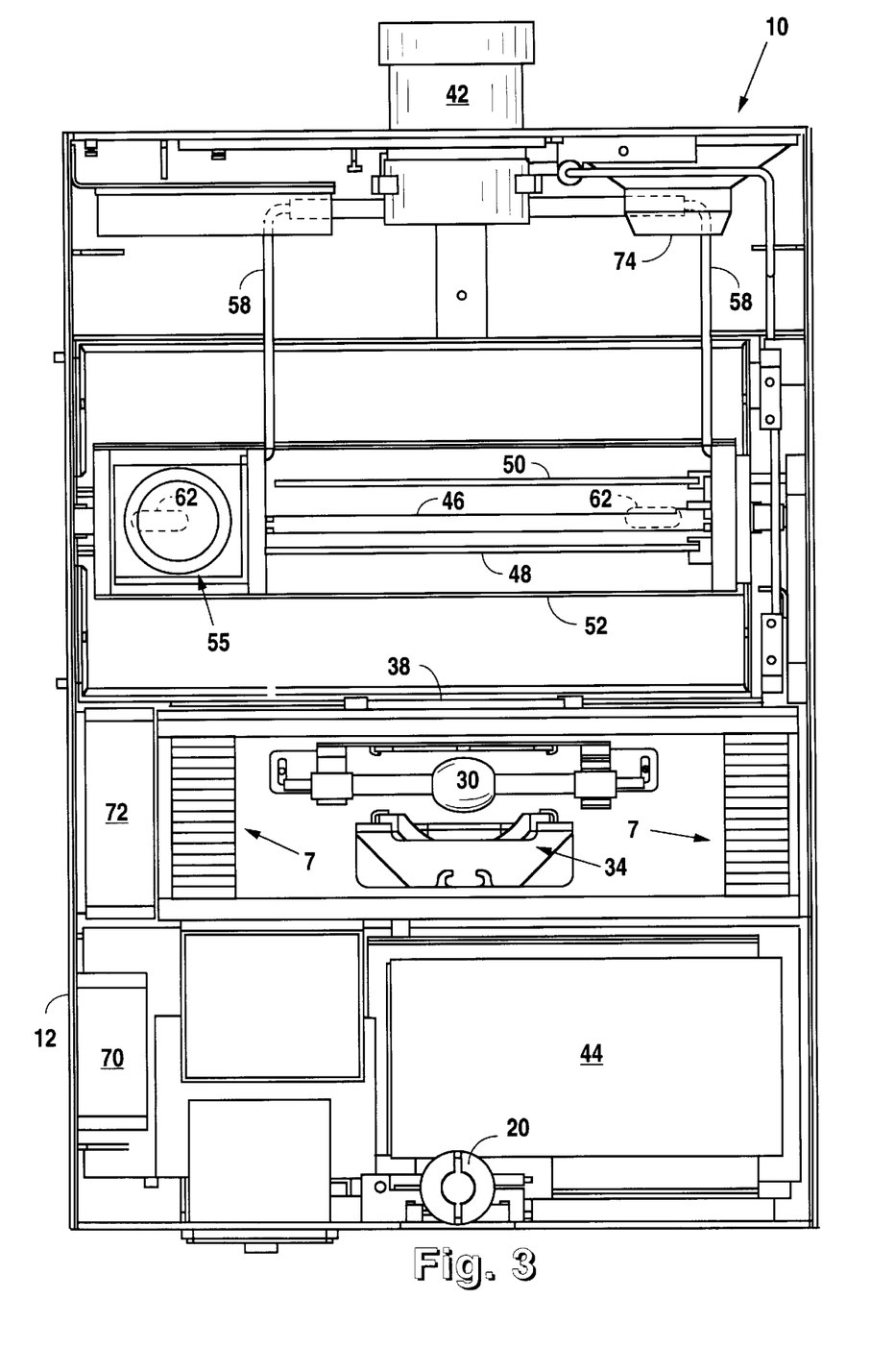
FIG. 3 is a cross sectional plan view of a compact integrated LCD projector, incorporating the present invention.

With further reference to FIG. 3, other components of projector 10 can be seen. These include a power supply fan 70 for cooling power supply 44, a light source fan 72 for cooling the optical module or plenum which may be surrounded by heat sink 32 for which conduction and convection thermal cooling occurs, and an optional speaker 74.

Referring to FIG. 4, in a preferred embodiment the light source assembly includes plenum 400, which may comprise body 402 and lid 404. Plenum 400 functions as a heat sink to capture and dissipate the heat generated by light source 30. In the illustrated embodiment, body 402 forms a 3-sided channel and lid 404 encloses a top side of plenum 400 when it is put in place. Plenum 400 is open at both ends to form a ventilation channel that allows air to move through plenum 400 in order to cool the light source that is contained therein and the surrounding environment which is heated by the Alight source. In a preferred embodiment, plenum 400 is has a window cut in one side of body 402 which is fitted with infrared filter 406. The useful light from light source 30 disposed within plenum 400 exits through infrared filter 406 and proceeds to other portions of the projector. One end of plenum 400 may be fitted with fan 72 for forcibly moving air through the plenum.

Light trap 410 is disposed in plenum 400 between the light source and the end of the plenum, substantially occupying the entire cross section of the plenum. The light trap inhibits light from escaping from the light source through the end of the plenum while allowing relatively free movement of fluid, such as cooling air, therethrough. The interior surfaces of plenum 400 may be treated or designed to assist in preventing the escape of light and/or infrared radiation from the plenum. For example, these surfaces may be designed with ridges or other physical geometries so as to preclude reflection of light or infrared radiation within the plenum. Furthermore, the interior surfaces may be anodized or painted to enhance absorption of radiation that impinges upon those surfaces. By capturing radiation in the lid and body of the plenum and in the light traps, these structures permit other components contained within the plenum to remain cooler. The air drawn through the plenum by fan 72 then conveys the hot air away from the plenum and its contents. The plenum body, lid, light traps and other components that are heated by radiation from light source 30 release heat into the surrounding air.

FIG. 5 illustrates a preferred embodiment of the present invention in the form of a cross section of an exemplary light source assembly. Disposed within plenum 400 is light source 30. Light source 30 may comprise bulb portion 416 which is the portion of the light source that provides illumination. Light source 30 may also comprise arm portion 418 and seal portion 420. Socket 414 provides physical support and electrical connectivity to light source 30. While bulb portion 416 of light source 30 generates substantial amounts of visible and infrared radiation, it is preferable to keep seal 420 relatively cool. If seal 420 overheats, it may reduce the life of light source 30. By trapping the infrared radiation emitted from bulb portion 416 in plenum body 402, lid 404 and light traps 410, 412, rather than permitting it to reflect within plenum 400, the temperature of seal portion 420 can be reduced substantially. Collimator assembly 422 is illustrated behind light source 30 in FIG. 5.

Two light traps are shown in FIG. 5. Light trap 410 is to the left of light source 30, and light trap 412 is to the right of light source 30. In the illustrated configuration, fan 72 pulls air from left to right through plenum 400 when the projector is turned on. Air is thus drawn through light trap 410, across the light source 30 and other components located within plenum 400, through light trap 412 and finally out through fan 72. FIG. 5 shows that the channels of light traps 410, 412 may be aligned in various ways, as desired by one who would use this invention. Light trap 410 is shown with channels that are perpendicular to the face of the light trap, while light trap 412 while light trap 410 is shown with channels that are not perpendicular to the face of the light trap.

If the projector is unplugged while light source 30 and the plenum and its contents are still hot, fan 72 will cease to force air through the plenum and the hot air within the plenum stratify near the top of the plenum chamber. A convection current will then be formed with hot air exiting from the top of the plenum through light traps 410 and 412 while cool air enters the bottom of the plenum, also through light traps 410 and 412. In this situation, light traps 410 and 412 operates to substantially reduce the temperature of air that exits the plenum. A substantial amount of mixing of hot and cool air occurs in the light traps due to air trying to enter and exit through each channel in the light trap. Furthermore, heat is conducted through the light trap material from the hot section near the top of the plenum toward the cooler sections lower in the plenum. This causes each light trap to act as a heat exchanger, whereby the cool air entering the plenum through the light trap effectively removes heat from the hot air exiting the plenum.

It has been noted in laboratory tests on prototype embodiments that the presence of light traps at each end of the plenum can reduce the temperature of air exiting the plenum by as much as 40–50 degrees Celsius. This is a substantial decrease in temperature which will contribute to the avoidance of heat-related damage caused by these types of projectors when they are unplugged before being allowed to cool.

Figure 6A:
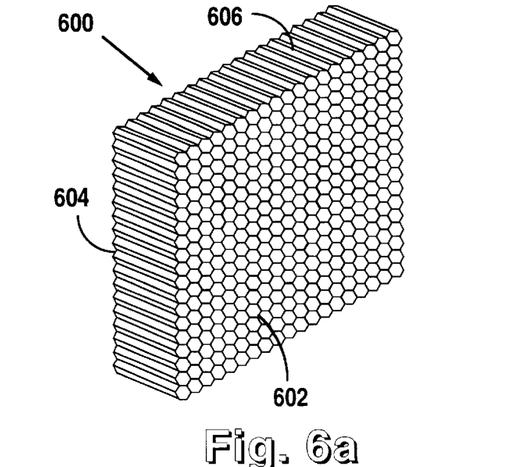
FIGS. 6A through 6D are illustrations of various embodiments and views of the light traps according to the present invention made from honeycomb-like material.

FIG. 6A illustrates a piece of honeycomb material which may be used as a light trap according to the present invention. Light trap 600 has first face 602, second face 604, and perimeter edge 606. It is comprised of a plurality of channels or conduits, each having first and second open ends, coincident with first and second faces 602, 604 of light trap 600. The conduits comprise wall portions which may be made of metallic or other material that is preferably opaque to the light or radiation that is to be blocked by the trap. Suitable cellular honeycomb material is available from Hexcel Corporation of Pleasanton, Calif.

Figure 6B:
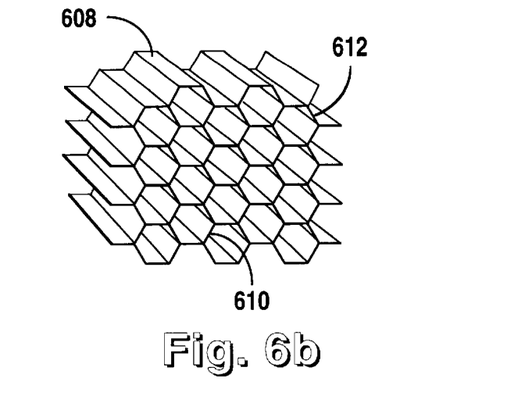

FIG. 6B illustrates a close-up enlarged view of a portion of the light trap of FIG. 6A, showing a typical arrangement of conduits 608, each having open ends 610 and walls 612. The cross sectional shapes of the conduits are a matter of design choice and availability of materials. Honeycomb materials with hexagonal shaped conduits (as illustrated) have been utilized in prototypes of the invention. In presently preferred embodiments, the honeycomb material is made of aluminum. The light trap may be approximately ½"–1" thick with channels approximately ¹⁄₁₆""¼" in diameter. Other channel geometries may be used with beneficial results in accordance with alternative embodiments of this invention, depending upon the specific needs of the application in which the trap is to be employed. For example, materials with circular, square, triangular or irregular channel shapes may be used in embodiments of the invention disclosed herein.

Figure 6C:
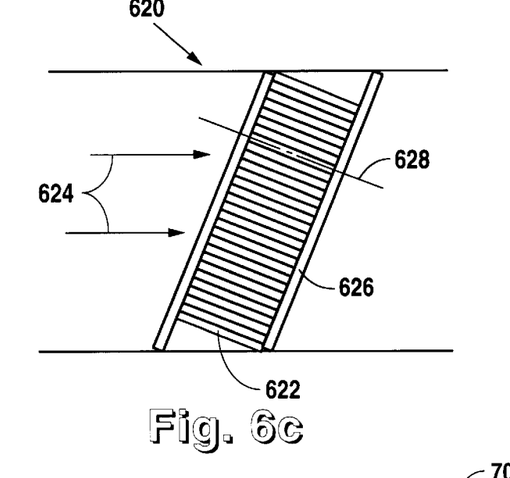

In preferred embodiments of the present invention, it is preferable for the axes of the conduits in the light trap to be oblique to the anticipated direction from which radiation impinges upon the trap. FIG. 6C shows how a light trap 622 having channels perpendicular to the faces of the trap may be installed at a slant within a duct 620 such that radiation 624 present in duct 620 will not be able to pass directly through the conduits of trap 622. Light trap guides 626 may be provided within duct 620 in order to hold light trap 622 at the desired degree of inclination.

Figure 6D:
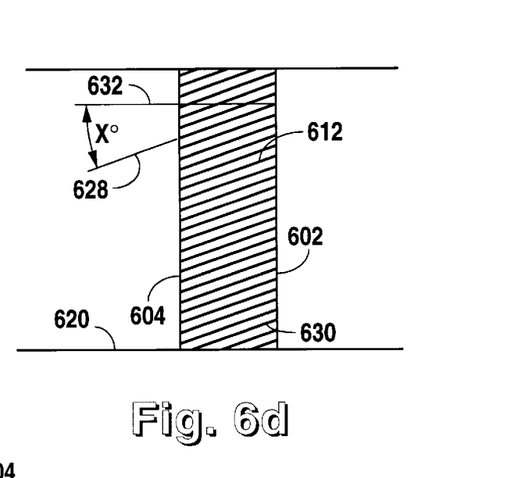

FIG. 6D illustrates a cross section of an alternative embodiment of a light trap 630 according to this invention. Light trap 630 has first face 602 and second face 604 which are parallel to one another. Line 632 indicates a direction which is perpendicular to first face 602 in the illustration. In this embodiment, the channels within light trap 630 are oblique to line 632, such that radiation traveling perpendicular first face 602 will be impeded by walls 612 within light trap 630. Such a light trap may be constructed by cutting honeycomb material on a bias with respect to the direction 628 of the channels, providing a light trap which may be installed squarely across a duct. This type of trap is able to intercept all radiation that is traveling in a direction parallel to the axis of the duct. The angle (X) of bias and the thickness of the trap may be selected to satisfy specific applications, and will depend upon the amount of transmitted light that can be tolerated and the amount of pressure change across the trap that is acceptable.

When light or infrared radiation enters a light trap as disclosed herein from a direction that is oblique to the conduits in the trap, the light will generally impinge upon a wall surface before it reaches the other end of the conduit. When the radiation contacts the wall, it will either be absorbed or reflected or both. A light trap according to this invention can be designed with suitable materials, coatings and geometries to accomplish a desired result in a particular application, taking into account the reflective and absorbent characteristics of available materials and coatings.

In a presently preferred embodiment, a light trap for use in an integrated projector is made of NOMEX HRH-78(A1) that is black anodized or painted black. (High-temperature plastic materials may also be used for light traps in this invention.) The trap is ½"–1" thick and the conduits are biased about 20 degrees from the axis of the duct in which the trap is used. The trap is held in place by sheet metal guides. Other embodiments suitable for selected applications will be recognized by persons skilled in the art as falling within the scope of this invention.

Figure 7:
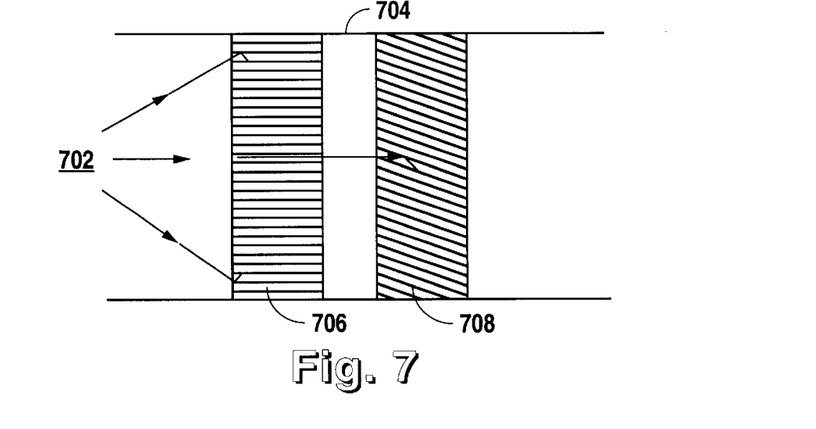
FIG. 7 is a cross sectional elevation view of a staged light trap which may be constructed in accordance with the present invention.

FIG. 7 illustrates how light traps according to this invention may be staged in order to ensure that all radiation that impinges upon the staged trap encounters a conduit wall before it gets through the trap. In the illustrated exemplary embodiment, first stage 706 comprises a block of honeycomb material having first and second faces that are perpendicular to the axes of the conduits within the honeycomb material. Second stage 708 comprises a block of honeycomb material wherein the first and second faces are cut on a bias with respect to the conduit direction. When these two stages are installed within duct 704 as illustrated, radiation 702 cannot pass directly through the staged trap regardless of the direction from which the radiation impinges upon the first stage. Any ray that passes through first stage 706 will necessarily encounter a wall in second stage 708. Alternative arrangements of honeycomb material in stages may be employed within the scope of this invention, depending upon the needs of a specific application.

In alternative embodiments of the present invention, the light trap may be designed to direct the air flow within the plenum, by selecting the direction in which the conduits of the light trap extend. For example, FIG. 5 shows an arrangement wherein light trap 410, on the side of plenum 400 on which air enters the plenum, has conduits angled to direct incoming cooling air upward toward the heat sink lid 404 of plenum 400. The lid may include ribs formed on its lower side (see FIG. 2, element 37) in order to efficiently absorb infrared radiation from inside of the plenum and to transfer the resulting heat to the cooling air stream. Other engineered light trap configurations may be developed by persons skilled in the art in order to direct the flow of cooling air to optimize the efficiency and life of the light source.

This invention can also be employed beneficially in other applications where it is necessary to provide a flow of air or other fluid through an apparatus, while preventing the escape of light or other radiation through the fluid flow channels of the apparatus. The walls of the honeycomb material may be made of a material selected to prevent passage of the radiation that is present, and the material may be arranged to permit fluid to flow through the channels therein, while blocking all straight-line (and selected reflected line) paths between the radiation source and the outside environment. Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

I claim:

1. A light source assembly in a portable projector for projecting images onto a surface, comprising:
    a high-intensity light source disposed within the light source assembly, the assembly comprising an enclosure within which the light source is positioned and having one or more ventilation channels permitting air to flow through the assembly; and
    a light and heat trap positioned adjacent the light source inside the enclosure and substantially entirely within at least one of said channels, the light and heat trap comprising a honeycomb material, the honeycomb material comprising an array of elongated conduits, each conduit having first and second open ends and a substantially opaque wall portion extending therebetween.

2. The light source assembly of claim 1, further comprising a reflector disposed behind the light source within the assembly and a condenser lens disposed in front of the light source.

3. The light source assembly of claim 1, wherein the conduits of the honeycomb material are oblique to an axis of the channel.

4. The light source assembly of claim 1, wherein the conduits of the honeycomb material are arranged so as to substantially prevent light from passing between the light source and an open end of the channel.

5. The light source assembly of claim 1, wherein the honeycomb material is made of aluminum.

6. The light source assembly of claim 1, wherein the wall portion of the honeycomb material is treated to enhance its absorption of visible and infrared light.

7. A computer image projector comprising a light source assembly in accordance with claim 1.

8. A television image projector comprising a light source assembly in accordance with claim 1.

9. A film projector comprising a light source assembly in accordance with claim 1.

10. The light source assembly of claim 1, wherein the array of elongated conduits for the light and heat trap form a wall structure for the ventilation channel.

11. The light source assembly of claim 10, wherein a first ventilation channel extends from one-side of the light source and a second ventilation channel extends from the other side of the light source, and wherein the light and heat trap is positioned to form a wall within the first ventilation channel and a second light and heat trap is positioned to form a wall within the second ventilation channel.

12. The light source assembly of claim 11, wherein the two light and heat traps have different orientations for their respective conduits with respect to the general direction of air flow.

13. The light source assembly of claim 10, wherein the fan is positioned adjacent the light and heat trap on a side opposite the light source.

14. In a portable image projector having a light source disposed within a plenum, the plenum having a ventilation channel, an improvement comprising a light and heat trap made of honeycomb material positioned inside of the ventilation channel and adjacent the light source so as to permit air to pass through the light and heat trap while substantially preventing light and infrared radiation from traversing the light and heat trap, wherein the honeycomb material comprises an array of elongated conduits, each conduit having first and second open ends and a substantially opaque wall portion extending therebetween.

15. The projector of claim 14, wherein the conduits of the honeycomb material are parallel to one another.

16. The light source assembly of claim 15, wherein the conduits of the honeycomb material are oblique to an axis of the channel.

17. The light source assembly of claim 14, wherein the conduits of the honeycomb material are arranged so as to substantially prevent light from passing between the light source and an open end of the ventilation channel.

18. The light source assembly of claim 14, wherein the honeycomb material is made of aluminum.

19. The light source assembly of claim 14, wherein the wall portion of the honeycomb material is treated to enhance its absorption of visible and infrared light.

20. The light source assembly of claim 14, wherein the array of elongated conduits for the light and heat trap form a wall structure for the ventilation channel.

21. The light source assembly of claim 19, wherein the array of elongated conduits for the light and heat trap form a wall structure for the ventilation channel.

22. A permeable light and heat trap in a projector for inhibiting selected radiation from traversing the trap while permitting a flow of fluid through the trap, the trap comprising a honeycomb material positioned within a ventilation channel adjacent a light source inside the projector, the honeycomb material comprising an array of elongated conduits each being generally aligned with a direction of air flow through the ventilation channel, each conduit having first and second open ends and a wall portion extending therebetween, the wall portion being substantially impermeable to the selected radiation.

23. The radiation trap of claim 22, wherein the conduits of the honeycomb material are parallel to one another.

24. The trap of claim 23, wherein the honeycomb material has a first face and a substantially parallel second face, the first face and the second face being coincident with the first and second open ends of the conduits, respectively, and wherein the conduits are offset from parallel to said first face of the honeycomb material.

25. The radiation trap of claim 22, wherein the wall portion of the honeycomb material is treated to enhance its absorption of the selected radiation.

26. The radiation trap of claim 22, wherein the wall portion of the honeycomb material is made of metal.

27. A portable image projector comprising:
    a projector case;
    a projection lens mounted in the projector case;
    means for providing an image to be projected through the projection lens disposed within the projector case;
    a light source assembly disposed within the projector case, the light source assembly comprising a plenum, a light source disposed within the plenum, and optical elements for conducting light from the light source to the means for providing an image;
    the plenum comprising means for capturing extraneous radiation that is emitted by the light source;
    the plenum further comprising a ventilation channel for allowing air to circulate through the plenum, the ventilation channel extending between the light source and an opening in a side of the projector case;

a light trap comprising honeycomb material positioned within the ventilation channel between the light source and the side of the projector case, the honeycomb material comprising an array of elongated conduits through which the air that circulates through the plenum passes.

28. The portable image projector of claim 27, wherein the plenum comprises ridges formed on its interior surfaces for capturing extraneous radiation that is emitted by the light source.

29. The portable image projector of claim 27, wherein the plenum comprises an absorbent coating disposed on its interior surfaces-for capturing extraneous radiation that is emitted by the light source.

30. The portable image projector of claim 27, wherein the elongated conduits in the light trap are all substantially parallel to one another.

31. The portable image projector of claim 27, further comprising a fan mounted in the projector case to force air through the plenum and through the light trap.

32. The portable image projector of claim 27, wherein the elongated conduits in the light trap are between about $1/16$ and $1/4$ inch in diameter.

* * * * *

UNITED STATES PATENT AND TRADEMARK OFFICE
CERTIFICATE OF CORRECTION

| | |
|---|---|
| PATENT NO. : 6,109,767 | Page 1 of 1 |
| DATED : August 29, 2000 | |
| INVENTOR(S) : Ernesto M Rodriguez, Jr. | |

It is certified that error appears in the above-identified patent and that said Letters Patent is hereby corrected as shown below:

[75] Inventors: "Ernesto M. Rodriguez" should read - Ernesto M. Rodriguez, Jr. - .

[73] Assignee: "Minnesota Mining and Manufacturing Company" should read - 3M Innovative Properties Company --.

[56] References Cited: Two references were not included. They are: 5,413,587 May 9, 1995 Hochstein 607/100
Hexcel, "HRH®-78 Nomex Commercial Grade Honeycomb Data Sheet 4400", (October 1995)

Specification:
Insert in the first line: -- This application is a continuation-in-part of co-pending applications: Serial No. 08/673,292, entitled "METHOD AND SYSTEM FOR THERMAL MANAGEMENT WITHIN A DISPLAY DEVICE", filed June 28, 1996, now issued as U.S. Patent No. 5,692,821, and Serial No. 08/787,075, entitled "COMPACT INTEGRATED LCD PROJECTOR", filed January 22, 1997, now issued as U.S. Patent No. 5,820,242, which is a continuation application of Serial No. 08/623,729, entitled "COMPACT INTEGRATED LCD PROJECTOR filed March 29, 1996, now abandoned. --

Column 6,
Line 45: "Light trap 410" should read -- Light trap 412 --.
Line 47: at the beginning of the line, "while light trap 412" should be deleted.

Column 8,
Line 45: "FIG. 2, element 37" should read -- FIG. 2, element 32 --.

Signed and Sealed this

Twenty-fifth Day of September, 2001

Attest:

NICHOLAS P. GODICI
*Attesting Officer*  *Acting Director of the United States Patent and Trademark Office*